United States Patent
Meng et al.

(10) Patent No.: US 11,256,012 B2
(45) Date of Patent: Feb. 22, 2022

(54) COLOR DISPERSION APPARATUS AND SPECTROMETER

(71) Applicant: BOE TECHNOLOGY GROUP CO., LTD., Beijing (CN)

(72) Inventors: Xianqin Meng, Beijing (CN); Wei Wang, Beijing (CN); Jifeng Tan, Beijing (CN); Xiandong Meng, Beijing (CN); Xiaochuan Chen, Beijing (CN); Jian Gao, Beijing (CN); Fangzhou Wang, Beijing (CN); Qiuyu Ling, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/483,910

(22) PCT Filed: Feb. 27, 2019

(86) PCT No.: PCT/CN2019/076326
§ 371 (c)(1),
(2) Date: Aug. 6, 2019

(87) PCT Pub. No.: WO2020/019711
PCT Pub. Date: Jan. 30, 2020

(65) Prior Publication Data
US 2020/0033514 A1 Jan. 30, 2020

(51) Int. Cl.
*G02B 5/18* (2006.01)
*G01J 3/28* (2006.01)
*G01J 3/18* (2006.01)

(52) U.S. Cl.
CPC ............. *G02B 5/1866* (2013.01); *G01J 3/18* (2013.01); *G01J 3/2803* (2013.01); *G01J 2003/1861* (2013.01)

(58) Field of Classification Search
CPC .......... G02B 5/1866; G02B 2005/1804; G01J 3/18; G01J 2003/1861
See application file for complete search history.

(56) References Cited

U.S. PATENT DOCUMENTS 10,502,620 B1 * 12/2019 Meng ................... G01J 3/18
2003/0076590 A1 4/2003 Kramer
(Continued)

FOREIGN PATENT DOCUMENTS

CN 1697986 A 11/2005
CN 101319936 A 12/2008
(Continued)

OTHER PUBLICATIONS

Lei Lie, Hao, "Microfluidic refractometer with integrated optical fibers and end-facet transmission gratings", Oct. 27, 2009 (Year: 2009).*

(Continued)

*Primary Examiner* — Maurice C Smith
(74) *Attorney, Agent, or Firm* — Westerman, Hattori, Daniels & Adrian, LLP

(57) ABSTRACT

The present disclosure relates to a dispersion apparatus. The dispersion apparatus may include an optical substrate; a grating layer on a first side of the optical substrate; and a light outlet layer on a second side of the optical substrate, the second side opposite the first side of the optical substrate. The grating layer is configured to perform dispersion of incident light into first-order diffracted beams having target wavelengths and transmit the first-order diffracted beams into the optical substrate, and wherein a diffraction angle of each of the first-order diffracted beams having the target wavelengths is smaller than a total reflection angle between the optical substrate and air. The light outlet layer is con- (Continued)

figured to extract the first-order diffracted beams having the target wavelengths in the optical substrate.

20 Claims, 11 Drawing Sheets

(56) References Cited

U.S. PATENT DOCUMENTS

| | | | |
|---|---|---|---|
| 2005/0078374 A1* | 4/2005 | Taira | G02B 6/0053 |
| | | | 359/569 |
| 2005/0264672 A1 | 12/2005 | Takahashi | |
| 2010/0321688 A1 | 12/2010 | Bodkin et al. | |
| 2011/0262307 A1 | 10/2011 | Packirisamy et al. | |
| 2012/0038987 A1* | 2/2012 | Iizuka | G02B 5/1866 |
| | | | 359/573 |
| 2012/0236382 A1 | 9/2012 | Puegner et al. | |
| 2013/0155394 A1* | 6/2013 | Saito | G01N 21/41 |
| | | | 356/128 |
| 2014/0168651 A1 | 6/2014 | Guo | |
| 2017/0131552 A1* | 5/2017 | Yokoyama | G02B 5/1866 |

FOREIGN PATENT DOCUMENTS

| | | |
|---|---|---|
| CN | 101387552 A | 3/2009 |
| CN | 101672695 A | 3/2010 |
| CN | 102288583 A | 12/2011 |
| CN | 103017905 A | 4/2013 |
| CN | 103528679 A | 1/2014 |
| CN | 104330161 A | 2/2015 |
| CN | 106471415 A | 3/2017 |
| CN | 106959370 A | 7/2017 |
| CN | 107247365 A | 10/2017 |
| CN | 107607475 A | 1/2018 |
| CN | 108917927 A | 11/2018 |

OTHER PUBLICATIONS

Office Action dated Apr. 22, 2020, issued in counterpart CN application No. 201810844249.9, with English translation. (8 pages).
Office Action dated June 5, 2019, issued in counterpart CN Application No. 201810844249.9, with English translation (13 pages).
Office Action dated Nov. 7, 2019, issued in counterpart CN Application No. 201810844249.9, with English translation (11 pages).
International Search Report dated Jun. 4, 2019, issued in counterpart Application No. PCT/CN2019/076326 (12 pages).

* cited by examiner

COLOR DISPERSION APPARATUS AND SPECTROMETER

CROSS-REFERENCE TO RELATED APPLICATION

This application claims benefit of the filing date of Chinese Patent Application No. 201810844249.9 filed on Jul. 27, 2018 the disclosure of which is hereby incorporated in its entirety by reference.

TECHNICAL FIELD

The present disclosure relates to the field of optical detection technology, and in particular, to a color dispersion apparatus and a spectrometer.

BACKGROUND

Currently, a complicated structure is used for realizing color dispersion, especially a holographic grating, a fiber Bragg grating, and the like. The holographic grating and the fiber Bragg grating are difficult to process. Conventionally, hold glass is used as an optical waveguide to realize light dispersion through glass; however, in this method, the light cited is limited.

BRIEF SUMMARY

An embodiment of the present disclosure provides a dispersion apparatus. The dispersion apparatus may include an optical substrate; a grating layer on a first side of the optical substrate; and a light outlet layer on a second side of the optical substrate, the second side opposite the first side of the optical substrate. The grating layer is configured to perform dispersion of incident light into first-order diffracted beams having target wavelengths and transmit the first-order diffracted beams into the optical substrate, and wherein a diffraction angle of each of the first-order diffracted beams having the target wavelengths is smaller than a total reflection angle between the optical substrate and air. The light outlet layer is configured to extract the first-order diffracted beams having the target wavelengths in the optical substrate.

Optionally, the dispersion apparatus further comprises a collimated light source on a side of the grating layer opposite from the optical substrate, wherein the collimated light source emits the incident light onto the grating layer.

Optionally, the grating layer comprises a plurality of gratings, the collimated light source comprises a plurality of light sources, and one of the plurality of gratings corresponds to at least one of the plurality of light sources.

Optionally, the plurality of gratings is in one-to-one correspondence with the plurality of light sources.

Optionally, one of the plurality of gratings and one corresponding light source of the plurality of light sources have a same central axis.

Optionally, the light outlet layer comprises a plurality of light outlets, each of the plurality of gratings corresponds to at least one of the plurality of light outlets. The at least one of the plurality of light outlets is configured to extract one of the first-order diffracted beams in the optical substrate transmitted by the corresponding one of the plurality of gratings.

Optionally, a thickness t of the optical substrate and a width $\Delta D$ of one of the plurality of light outlets corresponding to one of the plurality of gratings satisfy:

$$\Delta D = (\tan \theta_{d\text{-}max} - \tan \theta_{d\text{-}min})^* t,$$

wherein $\theta_{d\text{-}max}$ is the maximum angle of the first-order diffraction angle of the first-order diffracted beam having target wavelengths extracted by the light outlet, $\theta_{d\text{-}min}$ is the minimum angle of the first-order diffraction angle of the first-order diffracted beams having the target wavelengths extracted by the light outlet.

Optionally, the dispersion apparatus further comprises first black matrices on both sides of each of the collimated light sources and configured to absorb light that is not incident at a target angle, wherein a width w1 of each respective first black matrix satisfies:

$$w1 = 2^*\tan \theta_{d\text{-}max}^* t.$$

Optionally, the dispersion apparatus further comprises second black matrices on the second side of the optical substrate in one-to-one correspondence with the gratings, each respective second black matrix covering a portion of the second side of the optical substrate at least front a point which is an orthographic projection of a center of the corresponding grating on the second side of the optical substrate to a point of the light outlet nearest to the corresponding light source.

Optionally, centers of the second black matrices coincide with the points which are the orthographic projections of the centers of the corresponding gratings on the second black matrices respectively, and a width w2 of the second black matrix satisfy:

$$w2 = 2^*\tan \theta_{d\text{-}min}^* t$$

Optionally, each of the plurality of light sources comprises a light source and a collimating component, and wherein the collimating component has a micro- or nano-structure or is a light absorbing layer.

Optionally, two of the plurality of light outlets is disposed on opposite sides of each respective light source, so as to extract light in a same wavelength range, wherein the two light outlets alternately extract the first-order diffracted beams having adjacent target wavelengths.

Optionally, each of the plurality of light sources is a white micro-light emitting diode or a monochrome micro-light emitting diode.

Optionally, the light outlets on the second side of the optical substrate are provided with half-wave length grating structures.

Optionally, a diffraction intensity of the first-order diffracted light beams is in a range from about 15% to about 30%.

One example of the present disclosure is a spectrometer. The spectrometer may include the dispersion apparatus according to one embodiment of the present disclosure, a detection channel disposed on a side of the light outlet layer opposite from the optical substrate of the dispersion apparatus so as to receive one of the first-order diffracted beams having the target wavelengths; and a detection substrate on which at least a light sensor is disposed to detect light emitted from the detection channel.

Optionally, the detection channel comprises a microfluidic channel, and wherein a modified hydrophilic film layer is coated on an inner wall of the microfluidic channel Optionally, an upper portion of the detection channel comprises a fluid inlet port, a lower portion of the detection channel comprises a fluid outlet port, and wherein the detection channel is disposed in the second black matrix.

Optionally, the light sensor is disposed so as to receive light from the light outlet that emits the diffracted beam having the target wavelength on the second side of the optical substrate.

Optionally, a plurality of light sensors are disposed on me detection substrate, and wherein the light sensors are disposed in one-to-one correspondence with the first-order diffracting beams having the target wavelengths emitted from the light outlets respectively.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the present disclosure are apparent from the following detailed description taken in conjunction with the accompanying drawings in which:

DETAILED DESCRIPTION

Figure 1:
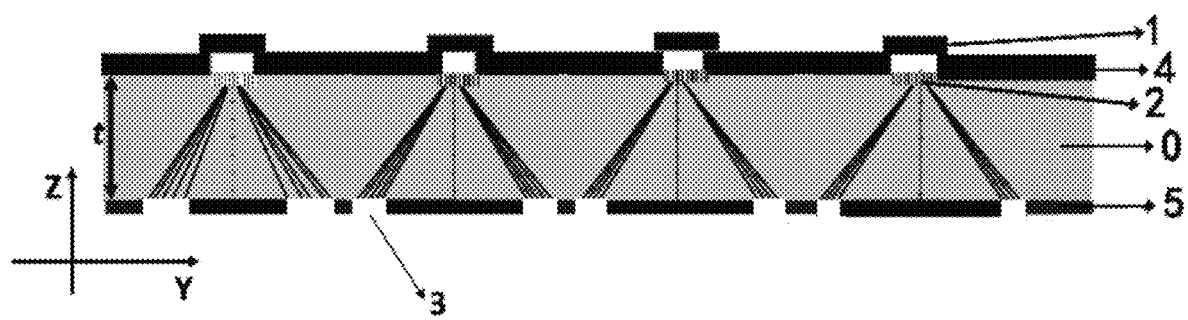
FIG. 1 is a schematic structural view of a color dispersion apparatus according to a first embodiment of the present disclosure.

In order to make the objects, technical solutions, and advantages of the embodiments of the present disclosure more apparent, the technical solutions according to the embodiments of the present disclosure will be described below clearly and fully with reference to the drawings, but the embodiments described below are only particular embodiments, which are not intended to represent all embodiments of the present disclosure. Based upon the embodiments in the present disclosure, other embodiments which will be apparent to those skilled in the an are within the scope of the present disclosure.

When an element and an embodiment of the present disclosure are introduced, the articles "a", "an", "the" and "said" are intended to indicate that one or more elements are present. The terms "comprising", "including", "containing" and "having" are intended to be inclusive and mean that there may be additional elements other than the listed elements.

For the purpose of surface description hereinafter, as direction-calibrated in the accompanying drawings, the terms "above", "below", "left", "right", "vertical", "horizontal", "top", "bottom" and derivatives thereof shall relate to the present disclosure. The terms "covered with", "on top of", "positioned on", or "positioned on lop of" mean that, for example, a first element of a first structure is on a second element of a second structure, wherein an intermediate element such as an intermediate structure may exist between the first element and the second element. The term "contact" means that, for example, the first element of the first structure and the second element of the second structure are connected directly or indirectly, and other elements may exist or not exist at the interface between the two elements.

Unless otherwise defined, all the terms (including the technical and scientific terms) used herein have the same meanings as commonly understood by one of ordinary skill in the art to which the present disclosure is directed. It is also understood that the terms such as defined in the usual dictionary should be interpreted as having the same meanings as the meaning in the context of the relevant technology. The terms should not be interpreted as an idealization or as having extreme meanings, unless they are explicitly defined herein. As employed herein, the statement that two or more parts are "connected" or "coupled" together shall mean that the parts are joined together either directly or joined through one or more intermediate parts.

In the description of the present disclosure, the terms "center," "horizontal," "vertical," "length," "width," "thickness," "upper," "lower," "front," "back," "left," "right." "top," "bottom," "inner," "outer," or the like are based on the orientation or positional relationship shown in the drawings. They are used merely for convenience of description and simplifying description of the present invention, but not to indicate or imply that the indicated apparatus or element must have a specific orientation, or be constructed and operated in a specific orientation, therefore cannot be construed as a limitation of the present disclosure.

In addition, the terms "first" and "second" or the like are for illustration purposes only and are not to be construed as indicating or implying relative importance or implied reference to the quantity of indicated technical features. Thus, features defined by the terms "first" and "second" may explicitly or implicitly include one or more of the features. In the description of the present disclosure, the meaning of "plural" is two or more unless otherwise specifically and specifically defined.

An objective of the invention is to solve problems of conventional color dispersion gratings such as complex structure, difficulty in processing, and low light effect.

One example of the present disclosure is a dispersion apparatus. The dispersion apparatus includes an optical substrate, a grating layer on a first side of the optical substrate, and a light outlet layer on a second side of the optical substrate. The second side is opposite the first side of the optical substrate. The grating layer is configured to perform dispersion of incident light into a plurality of first-order diffracted beams having target wavelengths and transmit the first-order diffracted beams into the optical substrate, and a diffraction angle of each of the first-order diffracted beams having the target wavelengths is smaller than a total reflection angle between the optical substrate and air. The light outlet layer is configured to extract the first-order diffracted beams having the target wavelengths in the optical substrate. In some embodiments, the grating layer, the light outlet layer and the optical substrate are an integrated structure.

In one embodiment, the dispersion apparatus further comprises a collimated light source on a side of the grating layer opposite from the optical substrate, wherein the collimated light source emits the incident light onto the grating layer.

In one embodiment, the grating layer comprises a plurality of gratings, and the collimated light source comprises a plurality of light sources. In one embodiment, the plurality of gratings is in one-to-one correspondence with the plurality of light sources. One of the plurality of gratings and one corresponding light source of the plurality of light sources have a same central axis. In some embodiments, the plurality of gratings may be formed by etching a surface of the first side of the optical substrate.

In one embodiment, the light outlet layer comprises a plurality of light outlets, and each of the plurality of gratings corresponds to at least one of the plurality of light outlets. The at least one of the plurality of light outlets is configured to extract the first-order diffracted beams having the target wavelengths in the optical substrate transmitted through the corresponding one of the plurality of gratings. In some embodiments, the plurality of light outlets may be formed by etching a surface of the second side of the optical substrate.

A first embodiment of the present disclosure provides a color dispersion apparatus having a structure as shown in FIG. 1, including:

An optical substrate 0 is configured to transmit light. A plurality of collimated light sources 1 are disposed on one side of the optical substrate; a plurality of gratings 2 are disposed on the one side of the optical substrate 0 and correspond respectively to the plurality of collimated light sources 1. The gratings are configured to perform dispersion of different wavelength bands of light from the corresponding collimated light sources 1 so that the diffraction angles of all the first-order diffracted beams having the target wavelengths in the dispersed light beam are smaller than the total reflection angle between the optical substrate 0 and air. A plurality of light outlets 3 configured to transmit or extract all the first-order diffracted beams having the target wavelengths in the dispersed light beam are disposed on another side of the optical substrate 0 relative to the corresponding collimated light source 1.

In some embodiments, a collimated light source is used. Specifically, an ordinary light source including a collimating component can be used. The collimating component can have a micro- or nano-structure, or it can be a light-absorbing layer. Specifically, the collimated light source can be made of collimated LED chips having a wide range of monochromatic spectrum. The collimated light can also be a collimated white micro-LED, a monochrome Micro-LED, or a laser light, and is not limited to these types. In order to lower the manufacturing cost, a collimated micro-LED chip is preferred in this embodiment.

In some embodiments, instead of a bold glass substrate, a resin or polyester compound with good stability can be used as the optical substrate, and other substrates can also be used. The material of the optical substrate can be determined according to actual needs. In order to transmit the dispersed light from the upper surface to the lower surface of the bold glass, the bold glass substrate has a minimum thickness requirement; and a minimum distance is required between beams of adjacent wavelength bands so that the sizes and positions of the micro-flow channels are in one-to-one correspondence with the sizes and positions of the light sensors.

The thickness t of the optical substrate 0, and the distance $\Delta D$ between the maximum angle and the minimum angle of the first order diffraction angles of all the target wavelength beams, satisfy the formula: $\Delta D = (\tan \theta_{d-max} - \tan \theta_{d-min})*t$. Here, $\theta_{d-max}$ represents the maximum angle of the first order diffraction angle, $\theta_{d-min}$ represents the minimum angle of the first order diffraction angle, and $\Delta D$ represents the width of the light outlet. Therefore, the thickness of the optical substrate and the distance between the maximum angle and the minimum angle of the first order diffraction angle of all the target wavelength beams can be determined based on the resolution of the spectrometer, the size of the light sensor, and the size of each beam of light. Based on this equation, even when the size of the light sensor cannot be made very small, the distance $\Delta D$ can be increased by changing the thickness of the bold glass.

The grating of this embodiment may be a simple grating. The grating period is determined based on the wavelength of the incident light, the refractive index of the materials in which the incident and emergent lights are transmitted, the angle of the incident beam, and the intended direction of the emergent light. Specifically, the grating period can be determined according to the first order diffraction angle, the wavelength band of the collimated light, and the refractive index of the optical substrate. The period of the grating is typically 0.5, but this value can be varied in actual product design (for example, to adjust the light, balance the brightness difference between different positions of the display panel, etc). The height of the grating is determined by the light intensity of the wavelength or the number of wavelengths, and can be from several hundred nanometers to several micrometers. If the grating is of another type of filler structure, a grating having a special structure can be built based on the specific wavelength of the filter and the angle of the emergent light, and can be a built-in micro-reflective mirror, or made of other micro-structures.

In the dispersion apparatus of this embodiment, the grating has a simple structure, and the collimated lights and the gratings are arranged in a one-to-one correspondence mode. Therefore, color dispersion is realized though the optical substrate simultaneously, and as a result, higher utilization of light energy can be achieved.

The light outlet for the target wavelength beams on the other side of the optical substrate is provided with a half-wavelength grating substrate, so that collimation of each wavelength can be achieved.

In some embodiments, the collimating component can also include a set of first black matrices 4 disposed on both lateral sides of each collimated light sources. The width w1 of the first black matrix is determined according to the following equation;

$$w1 = 2*\tan\theta_{d\text{-}max}*t.$$

The first black matrix of this embodiment is mainly used to absorb light that is not incident at a target angle.

Figure 2:
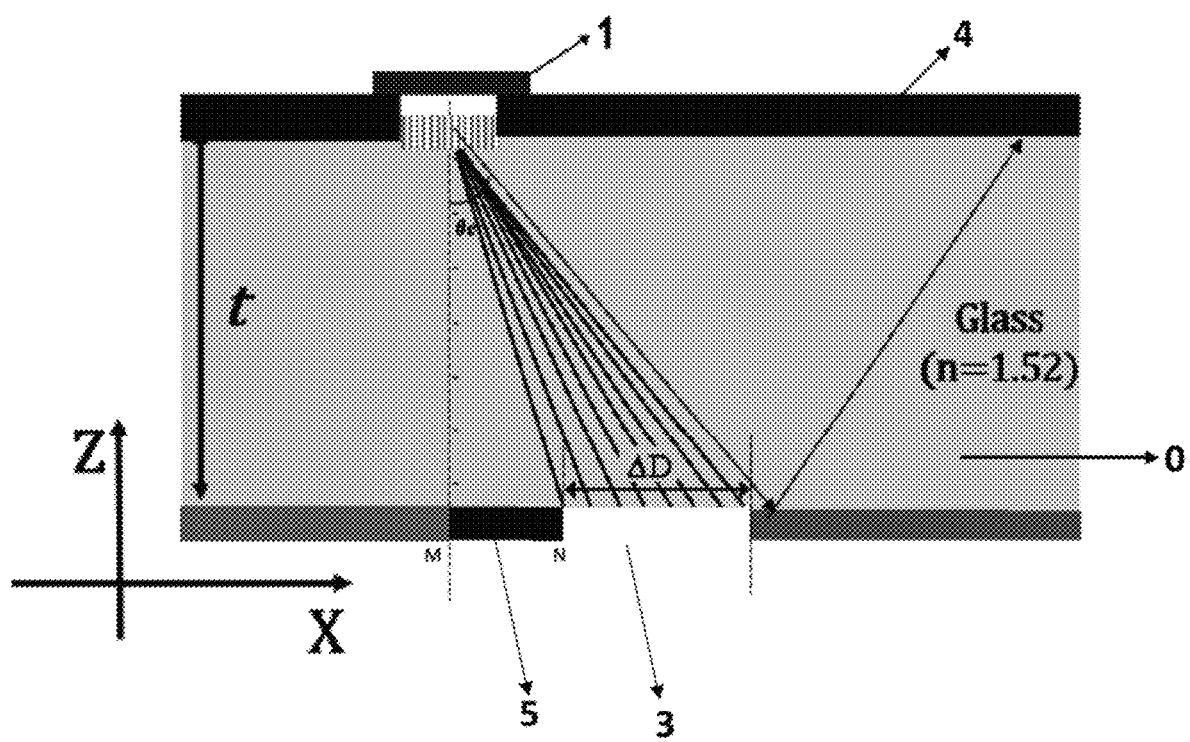
FIG. 2 is an enlarged partial schematic structural view of the color dispersion apparatus according to the first embodiment of the present disclosure.
Figure 3:
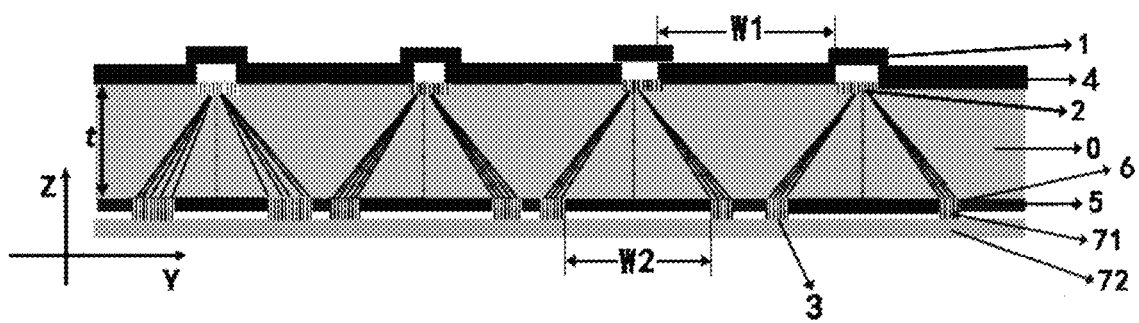
FIG. 3 is a schematic structural view of a spectrometer according to the first embodiment of the present disclosure.

In some embodiments, the above-described dispersion apparatus can also include a set of second black matrices 5 disposed on the other side of the optical substrate in a one-to-one correspondence with the gratings 2. As shown in FIG. 2, the second black matrix 5 covers a portion of the other side of the substrate at least from the point M which is the orthographic projection of the center of the grating 2 on the other side of the optical substrate 0 to point N which is the starting point of the light outlet 3. Further, as shown in FIG. 3, the center of the second black matrix 5 starting from the right of the light outlet 3 coincides with the projection of the center of the grating 2 along a direction perpendicular to the optical substrate 0. The width of the second black matrix 5 is: $w2 = 2*\tan\theta_{d\text{-}min}*t$. The arrangement of the second black matrix can reduce interference of other wavelengths of light during detection, so that measurement accuracy and the signal-to-noise ratio can be improved.

The material of the first black matrix and the second black matrix can be a black photoresist resin film or a chromium or chromium oxide metal film (Cr/CrO), and the black matrix has a determined thickness for the purpose of absorbing non-target wavelength light, for example, the thickness is about 100 nm.

In some embodiments, respective light outlets are disposed on both sides of the respective collimated light sources, and are configured to transmit or extract the light in the same wavelength range. In addition, alternate wavelengths are transmitted from the light outlets on both sides. In this embodiment, by transmitting light on both sides, the spacing between beams having adjacent wavelengths is increased, and thereby, the size limitation of the light sensor, can be compensated.

In some embodiments, the diffraction intensity of the first order diffraction in the diffracted light is set between 15-30% so that interference caused by the light resulting from larger-order diffraction can be reduced.

FIG. 3 is a schematic view of a spectrometer according to a second embodiment of the present disclosure. The spectrometer includes: the dispersion apparatus 1 according to the first embodiment; a detection channel 6 for materials to be tested, disposed on the other side of the optical substrate of the dispersion apparatus, so as to receive the target wavelength light beams emitted therefrom; and a detection substrate 71 provided with light sensors 72 thereon for detecting light transmitted from the detection channel 6.

In this embodiment, the detection channel 6 includes one or several microfluidic channels. The width and the height of the microfluidic channel can be nanoscale, but it can also be larger or smaller based on the design adapted to the actual application. No special requirements are imposed on the size of the microfluidic channel. The microfluidic channel can be formed on silicon, glass, or a polymer, such as polydimethylsiloxane (PDMS) or polymethyl methacrylate (PMMA), for example, by photoetching and etching methods. The microfluidic channel can also be made from other materials based on the specific requirements for the microfluidic channel. The materials of the inner walls of the microfluidic channel are determined based on actual needs. Generally, an overlay hydrophilic film layer is located in the microfluidic channel so that the micro-fluid moves or temporarily stays in the microfluidic channel according to the experimental requirements. For example, a Teflon-AF hydrophobic layer can help reduce or avoid adhesion of the micro-fluid to the microfluidic channels as much as possible, so that the micro-fluid moves according to demand.

Figure 4:
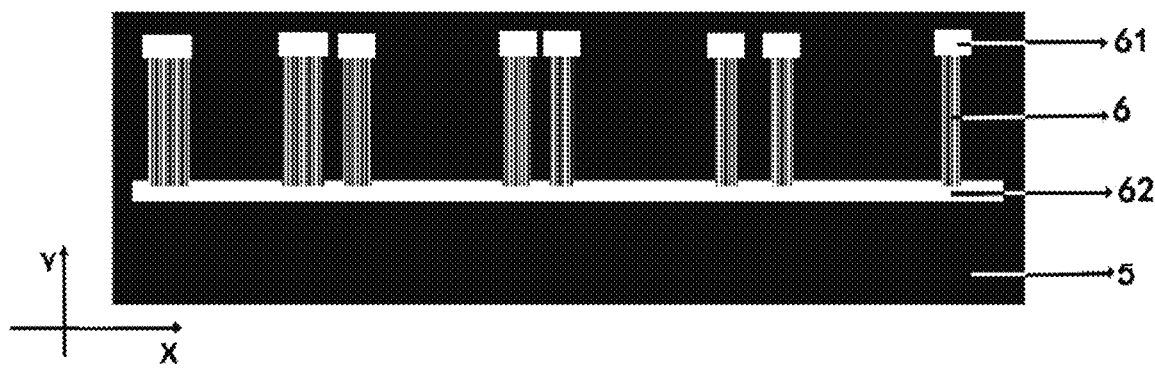
FIG. 4 is a schematic structural view of a micro-flow channel according to a second embodiment of the present disclosure.

FIG. 4 is a schematic view of the detection channel 6 disposed on the second black matrix 5. The upper portion of the detection channel 6 is connected to a fluid inlet port 61, and the bottom portion of the detection channel 6 is connected to a fluid outlet port 62.

Each of the above described light sensors 72 is disposed on the detection substrate 71 and corresponds to the respective light outlet of the target wavelength light beams on the other side the optical substrate. Specifically, the light sensor 72 is arranged in one-to-one correspondence with the target wavelength light beams emitted from the light outlet; and because the light sensor and the light outlet are required to correspond to each other, the distance between the two depends on the accuracy of the light coupling structure (array) in the incident light direction and the signal-to-noise ratio requirement of the photodetector; and it is preferred to have the two closely fit together (a buffer film layer can be placed between them, for example). The light sensor can be charge-coupled device (CCD), complementary metal-oxide-semiconductor (CMOS), PIN, and the like.

During operation, the micro-fluid is divided into droplets of nanoliter or picoliter size that enter different detection channel and undergo a physical and chemical reaction at a specific wavelength. The information on the micro-fluid before and after the physical and chemical reaction is detected and benchmarked by the light sensor at the bottom of the determinant channel. The micro-fluid enters the fluid outlet well when the detection is complete.

In this embodiment, the desired resolution of the spectrometer under the size constraints of a light sensor can be achieved by setting at least one parameter among the thickness of the grating, the grating spacing, and the number of gratings.

The spectrometer provided in this embodiment can be applied to physical, chemical, and biological correlation, and can be used in the fields of spectrum analysis, molecular diagnosis, food quarantine, bacterial classification and the like.

Hereinafter, the principle and the selection of the above spectrometer will be described in detail with reference to specific examples and the accompanying figures.

(1) The Basic Structure of the Spectrometer of this Embodiment

In one embodiment, the basic device includes an optical substrate, a microfluidic substrate, and a detection substrate. In this embodiment, part of the optical substrate is a 2 mm glass substrate which is mainly configured to disperse white light. The microfluidic substrate can be a single layer substrate, and the material can be PDMS or PMMA. It is also possible to apply a photoresist on the optical substrate and perform exposure of a specific area to make the microfluidic channel or channels. In order for the droplets or gas to pass through the microfluidic channel or channels, a spin-on photoresist is used in this embodiment, and then a microfluidic channel is directly formed on the upper surface of the detection substrate by using the exposure method. Micro-reactor ports and fluid outlet ports can be formed by masking. The detection substrate is formed by integrating a light sensor on the detection substrate. The detection substrate can be a glass substrate or a substrate made of another material, and the material can be selected based on actual needs. The main function of the detection substrate is to detect the optical signal passing through the microfluidic channel, in order to facilitate visual observation and tracking, the light sensor can be made of transparent electrodes such as indium tin oxide (ITO) or aluminum doped Zinc Oxide (Al-doped ZnO).

(2) Light Source Selection

A: micro-LEDs of a plurality of colors as the light sources.

In this embodiment, a single color micro-LED with a wide spectrum is used as a light source to achieve the purpose of obtaining sub-wavebands through the grating dispersion.

After the collimation process is carried out on different micro-LEDs, the collimated lights enter the gratings. The collimation process can use a micro- or nano-structure (such as a bull's eye structure), or it can use a black matrix which blocks and absorbs stray light. White micro-LEDs can also be used as light sources, when designing different gratings to disperse different wavelength bands, so as to achieve a higher precision spectral dispersion.

B: Monochromatic micro-LED with wide spectrum as the light source.

Figure 5A:
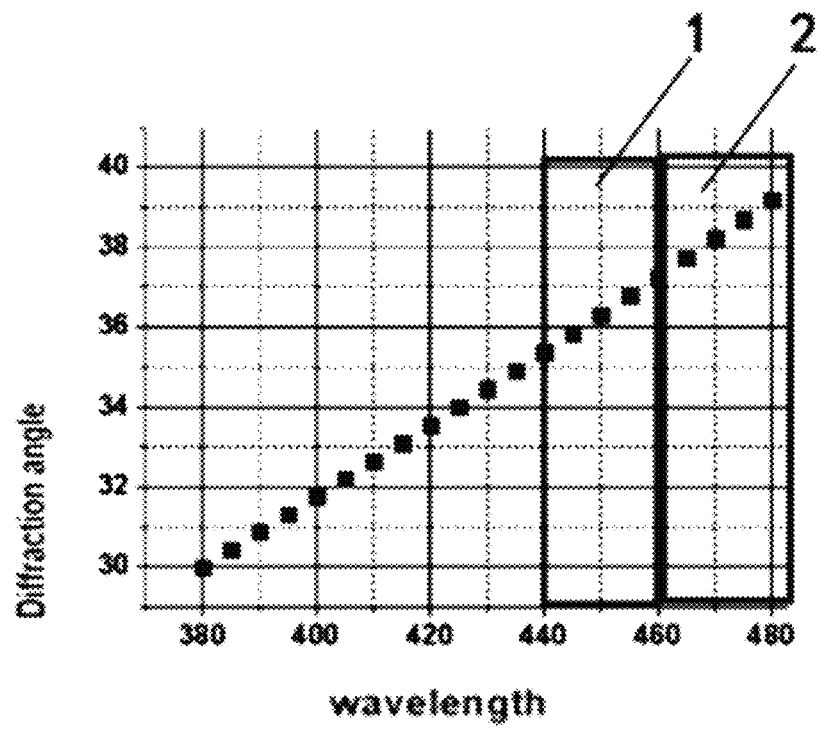
FIG. 5a is a distribution diagram of a first-order diffraction angle as a function of wavelength for a royal blue and blue Micro-LED light passing through a 500 nm grating according to a third embodiment of the present disclosure.
Figure 5B:
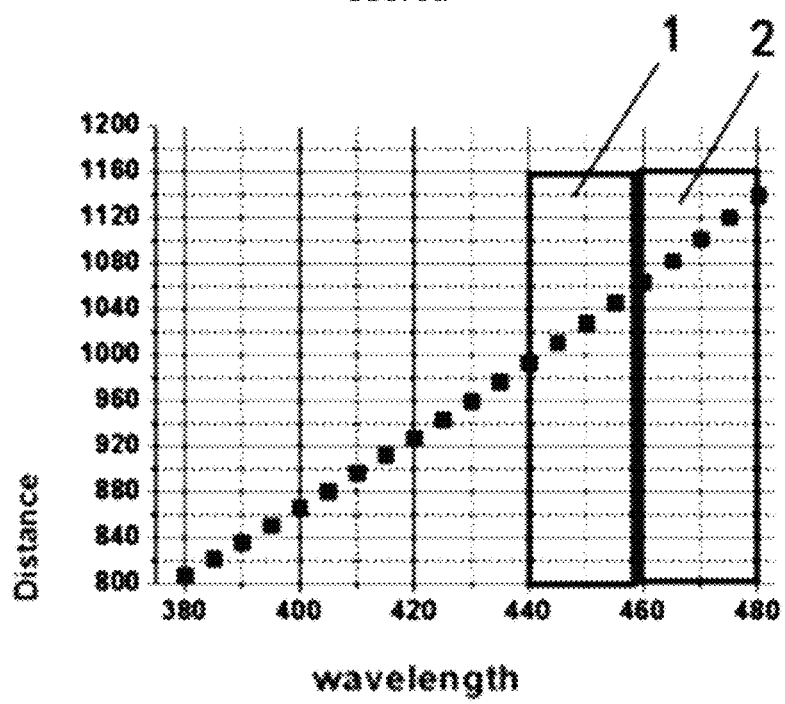
FIG. 5b is a distribution diagram of a distance from a center position of the light source as a function of wavelength after the royal blue and blue Micro-LED light has passed though a substrate having the 500 nm grating according to the third embodiment of the present disclosure.

In one embodiment, the royal blue (440 nmm, 460 nm) and blue (460 nm, 480 nm) micro-LED are selected, and a simple grating with line width and height of 250 nm respectively and a 500 nm grating period can be used. Comparison of the diffraction angle, the distance from the light source, and the first-order diffraction intensity are as shown in areas 1 and 2 of FIGS. 5a to 5c. In one embodiment, a wide-spectrum monochromatic Micro-LED is used as the light source to achieve grating dispersion of light of different bands of wavelengths, Generally, a half-width of a wavelength peak of an emitted light of a Micro-LED is about 20 nm. In the case of Luxeon, one grating corresponds to a spectral range of only one Micro-LED to achieve a target resolution such as 1 nm or 5 nm.

TABLE 1

LUXEON wavelength ranges of different colors of Micro-LED sources.

| Color | Min-wavelength(nm) | Max-wavelength (nm) |
|---|---|---|
| Royal Blue | 440 | 460 |
| Blue | 460 | 480 |
| Cyan | 490 | 510 |
| Green | 520 | 540 |
| Amber | 585 | 595 |
| Red orange | 610 | 620 |
| Red | 620 | 645 |

A grating with other parameter: can also be used as long as the first-order diffraction angle of the first-order diffracted beam having the maximum wavelength is smaller than the critical angle relative to air (for example, if die optical medium is glass, the critical angle is 41°). When designing the grating, in order to maximize ΔD and arrange more sensors or microfluidic channels within the limited range of ΔD so as to improve the accuracy of the spectral detection, the larger the difference between the diffraction angles of the first-order diffracted beams having the largest and smallest wavelengths, the better.

(3) The Principle and Description of Dispersion.

A simultaneous dispersion of the light from a single micro-LED through the grating on the surface of a bold glass is achieved so as to realize a higher utilization of light energy. The following method can be used:

Step 1: Diffract ail incident light using a first order diffraction to reduce interferences caused by higher order diffraction of light.

Step 2: Set the diffraction angle of all first-order diffraction wavelengths to be smaller than the total reflection angle $\vartheta_c$ between the glass and the air:

$$\vartheta_c = \sin^{-1}(n_1/n_2) = 41° \quad (1);$$

According to die diffraction equation:

$$n_i * \sin\theta_i - n_d \sin\theta_d = m * \frac{\lambda}{\Lambda} \quad (m = 0, \pm 1, \pm 2, \ldots ); \quad (2)$$

Here, $n_i$ and $\theta_i$ represent the refractive index of the incident medium and the angle of the incident light, respectively, m represents the diffraction order, $\Lambda$ represents the grating period, $\lambda$ represents the wavelength of the incident light, $\theta_d$ represents the included angle between the direction of the diffracted light and the normal to the flat panel, and $n_d$ represents the refractive index of glass and air.

The incident light is diffracted by transmission and dispersion through the grilling according to equation (1). In order to reduce or avoid chromatic dispersion according to different diffraction orders, there is only one diffraction order after all the wavelengths pass through the grating so that the diffraction angle of each diffraction order is different, and the target wavelength light beams can be separated sequentially. However, it is difficult to use only-one grating to achieve a wide spectrum such as 380-780 nm of light having one diffraction order. Therefore, a plurality of different colors of micro-LEDs with corresponding simple gratings is used to carry out dispersion of sub-waveband diffraction.

Figure 6A:
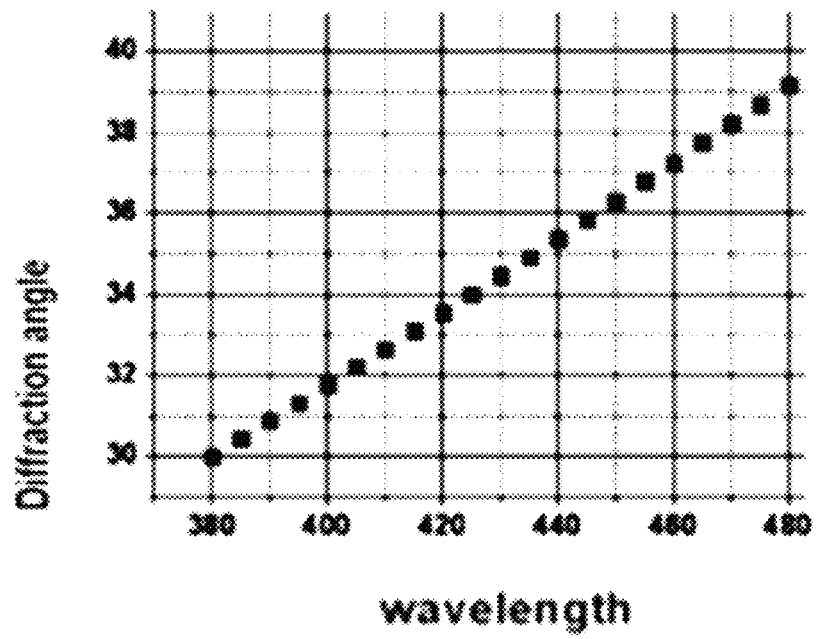
FIG. 6a is a distribution diagram of a first order diffraction angle as a function of wavelength for an incident beam passing through a 500 nm grating according to a fourth embodiment of the present disclosure.
Figure 6B:
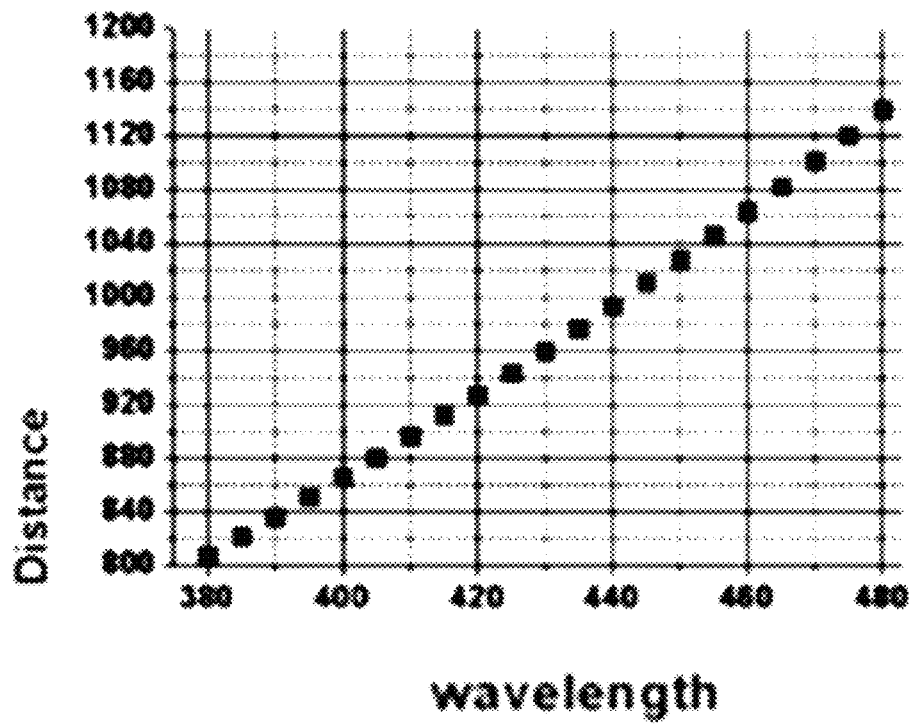
FIG. 6b is a distribution diagram of a distance from a center of an incident ray as a function of wavelength after passing through a substrate having the 500 nm grating according to the fourth embodiment of the present disclosure.
Figure 6C:
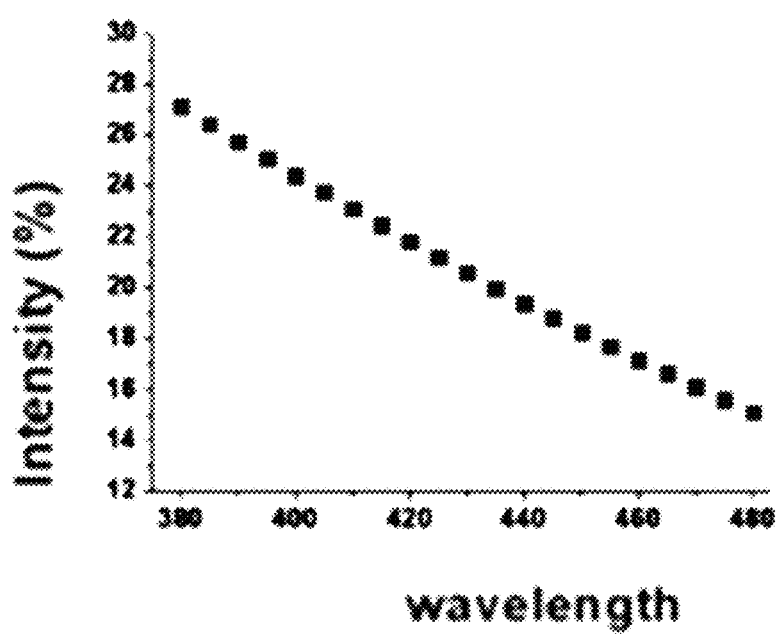
FIG. 6c is a distribution diagram of a first order diffraction intensity as a function of wavelength for an incident ray after passing through the substrate having the 500 nm grating according to the fourth embodiment of the present disclosure.

FIG. 6a is a schematic diagram of the first-order diffraction angle distribution passing through a 500 nm grating period according to a fourth embodiment of the present disclosure. FIG. 6b is a schematic diagram of the distance between each wavelength from the center of the light source, and FIG. 6c is a schematic diagram of the first-order diffraction intensity distribution.

The distance of each wavelength from the point where the center light source is projected on the substrate after dispersion can be calculated using the equation (3):

$$\text{Distance} = \tan \theta_d * t \quad (3):$$

Where $\theta_d$ represents the diffraction angle, and t represents the thickness of the bold glass. At this time, the maximum and minimum diffraction angles can be calculated using the equation (2), and the distance ΔD between the maximum wavelength and the minimum wavelength beams after dispersion can be calculated using the equation (4):

$$\Delta D = (\tan \theta_{d\text{-}max} - \tan \theta_{d\text{-}min}) * t \quad (4);$$

Where $\theta_{d\text{-}max}$ and $\theta_{d\text{-}min}$ represent the maximum and the minimum angles of the first-order diffraction, and t represents the thickness of the bold glass. It can be seen from equations (3) and (4) that the thickness of the bold glass has a crucial role in the spacing between the target wavelength beams after dispersion, and that the distance ΔD after dispersion has a proportional relationship with the thickness of the bold glass. Therefore, if the microfluidic channel or the sensor cannot be reduced in size, the thickness of the bold glass can be adjusted in order to increase the distance ΔD so as to achieve the one-to-one correspondence relationship between the diffraction angle of the target wavelength beam, the positions of the microfluidic channel, and the sensor.

Of course, the above purpose can also be achieved by changing the characteristics of the grating. However, by changing the geometrical parameters of the grating, only the diffraction angle $\theta_d$ can be changed. By one transmission dispersion with a diffraction angle less than the total reflection angle, $\theta_d$ is al most 41°. $\Delta$Dmax=0.869*t. Therefore, the ability to change Distance by changing the diffraction angle is very limited. According to the results calculated by Equation 3-4 (FIG. 5b), it can be seen that using the grating having a period of 500 nm and a 2 mm thick of glass, $\Delta$D can be 1140-800=340 um. If the photosensitive sensor can have a size of 1 um, die spectrometer resolution can reach 0.3 nm.

Figure 5C:
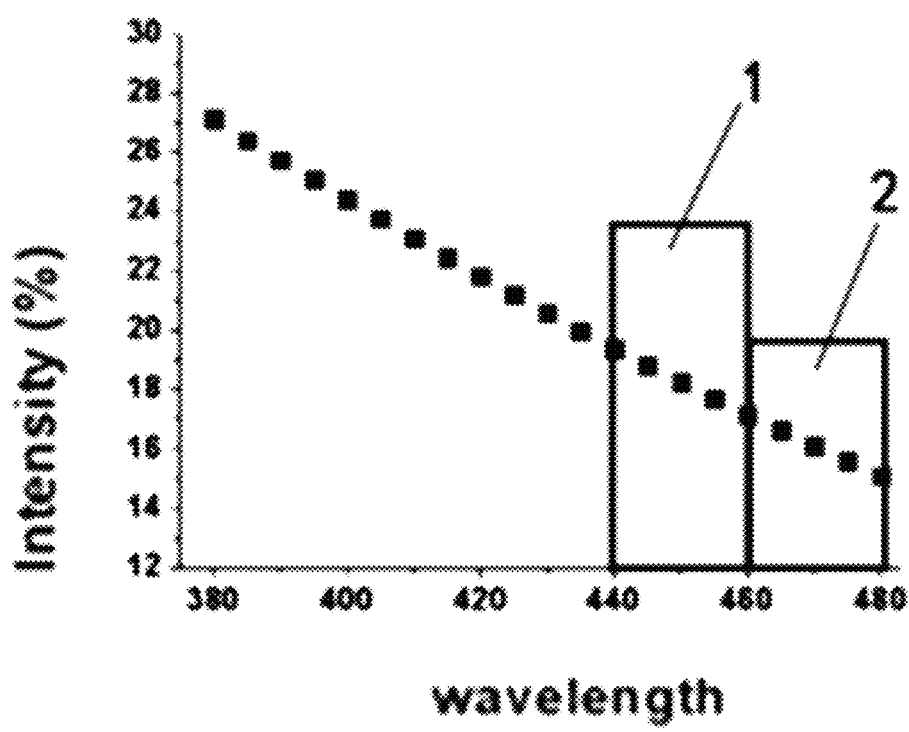
FIG. 5c is a distribution diagram of a first-order diffraction intensity as a function of wavelength for the royal blue and blue Micro-LED light after passing through the substrate having the 500 nm grating according to the third embodiment of the present disclosure.

According to the optical modeling calculation and optimization software VirtualLab modeling, the calculated first-order diffraction (+1 or −1 order diffraction) has a diffraction intensity between about 15-30% (as shown in FIG. 5c), With a line width/period of 50% and a height/line width of 1:1, this efficiency can be optimized to a maximum by optimizing duty cycle and height of the grating.

In some embodiments, the left and right sides of the micro-LEDs require a black matrix to isolate from ambient light, and at the same time, to absorb the light that has been reflected by the lower surface of the glass because the light has a diffraction angle greater than the total reflection angle. The first black matrix disposed on the left and right sides of the micro-LED has a width w1:

$$w1 = 2 * \tan \theta_{d\text{-}max} * t \quad (5);$$

Where t represents the thickness of the bold glass, and $\theta_{d\text{-}max}$ represents the maximum value of the first-order diffraction angle.

The first black matrix is used to absorb light of a diffraction order greater than the total reflection angle.

Figure 7:
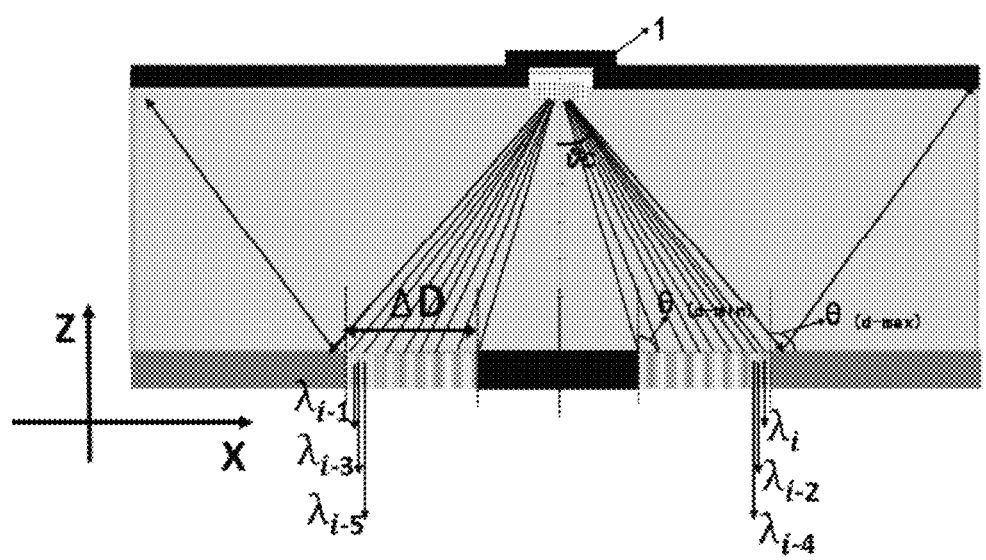
FIG. 7 is a schematic diagram of an incident ray passing through a bold glass having a +/− diffraction grating according to a fifth embodiment of the present disclosure.

In addition, through the diffraction characteristics of the grating, when the surface light source is collimated and perpendicularly incident, the diffraction angles are the same on both sides for the first diffraction orders. That is, the diffracted angles are symmetrically distributed around the normal direction, and the diffraction intensity is also the same as shown in FIG. 7. Accordingly. $\Delta$D becomes twice the original $\Delta$D, and the resolution is half of the original.

As shown in FIG. 7, the first-order diffraction angles of different wavelengths on the left and right sides are symmetrically distributed. The $\Delta$D on the left and right sides are used to extract the light in the same wavelength range so $\Delta$D becomes twice the original distance of each side. Taking the size of the sensor into consideration, light can be emitted at intervals on the two sides of the separation area. At one side of the separation area, the microfluidic channel can be formed at the position where the light beams ($\lambda_+$, $\lambda_{i-2}$ ...) emerge and the light separated into the corresponding separate wavelengths. Similarly, the microfluidic channel can be formed at the position where the light beams ($\lambda_{i-1}$, $\lambda_{i-3}$ ...) emerge symmetrically at the other side of the separation area, these light beams having the corresponding wavelengths. In order to make up for the potential defect when the sensor cannot achieve the target size, the gap $\Delta$D between the previous wavelength and the next wavelength can be made larger.

TABLE 2 comparison of 2 * $\Delta$D and sensor pitch of 8 sets of different gratings after one transmission dispersion passing through a 4 mm thick of a bold glass.

| Wavelength range (nm) | Grating period (nm) | Minimum diffraction angle ($\theta_{dmin}$) | Maximum diffraction angle ($\theta_{dmax}$) | 2 * $\Delta$D (um) | Sensor pitch (um) |
|---|---|---|---|---|---|
| 380-430 | 450 | 35 | 40.6 | 1250 | 25 |
| 430-480 | 500 | 35.9 | 40.9 | 1134 | 22 |
| 480-530 | 560 | 35.8 | 40.3 | 1010 | 20 |
| 530-580 | 610 | 36.5 | 40.7 | 957 | 19 |
| 580-630 | 660 | 37 | 40.9 | 897 | 18 |
| 630-680 | 720 | 36.9 | 40.4 | 797 | 16 |
| 680-730 | 770 | 37.3 | 40.6 | 758 | 15 |
| 730-780 | 820 | 37.3 | 40.9 | 831 | 17 |

If the size of the sensor is about 1.5 um, a spectral resolution of 0.1 nm can be achieved.

In one embodiment, the minimum sensor size is 20 um, based on the 2 mm thick of bold glass, the resolution achieved can be calculated as below:

$$\text{Resolution} = \Delta\lambda/(\Delta D/\text{Sensor size}) \quad (6)$$

Taking the 500 nm period of the grating as an example, $\Delta\lambda$=480-380 nm=100 nm. $\Delta$D=340 um with 20 um as the limit of the sensor size, 340 um/20 um=17 wavelengths can be distinguished. That is, the spectral range of 100 nm is divided into 17 wavelengths, and a dispersion resolution of 6 nm can be achieved.

In one embodiment, die grating period is 470 nm, the line width and height are both 50% of the period, the glass thickness is 2 mm. According to the formulas 1 and 2, and the requirement that the first-order diffraction angle is smaller than the total reflection angle, the $\Delta$D is 233 um. With 20 um as the limit size of the Sensor, 12 Sensors can be arranged in the 233 um range. Thus, the target band (440-460) is separated by 12 sensors, and the resolution can reach 2 nm. If the sensor size can be 1 um, the resolution can be as high as 0.086 nm.

If a higher resolution is to be achieved, it is necessary to change the diffraction angle by changing the thickness of the bold glass as shown in Equations 1 and 2, the grating period, or the number of gratings to achieve a smaller resolution. If a resolution of 1 nm is to be achieved, the grating parameters and the glass thickness, as well as the number of gratings can be estimated using Equations 1-4.

Figure 8:
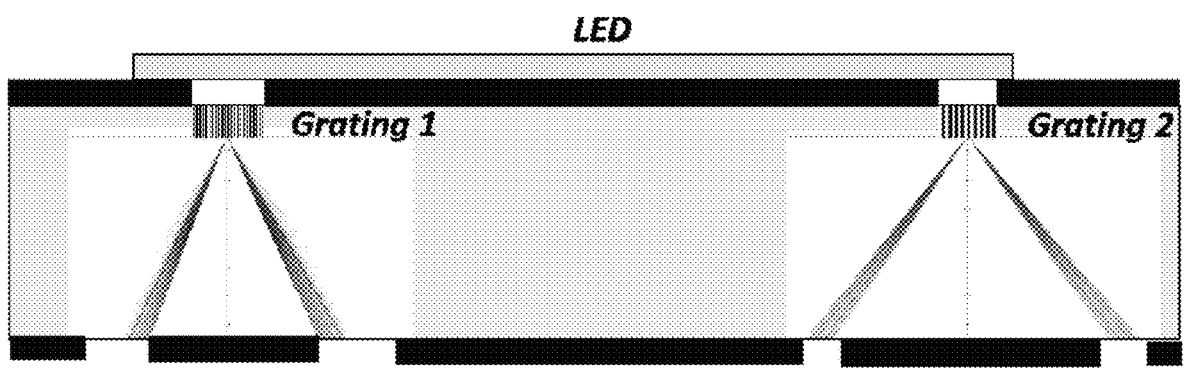
FIG. 8 is a schematic structural view of a color dispersion apparatus according to one embodiment of the present disclosure.

In one embodiment, one light source corresponds to more than one grating, such as two gratings as shown in FIG. 8. For example, when the transmission distance after dispersion is too short, so that the lateral interval between the single-wavelength lights after dispersion is too short. Because the processing limit of the micro-How channel is larger than this lateral interval, it can be designed that a light source corresponds to more than one grating.

Figure 9:
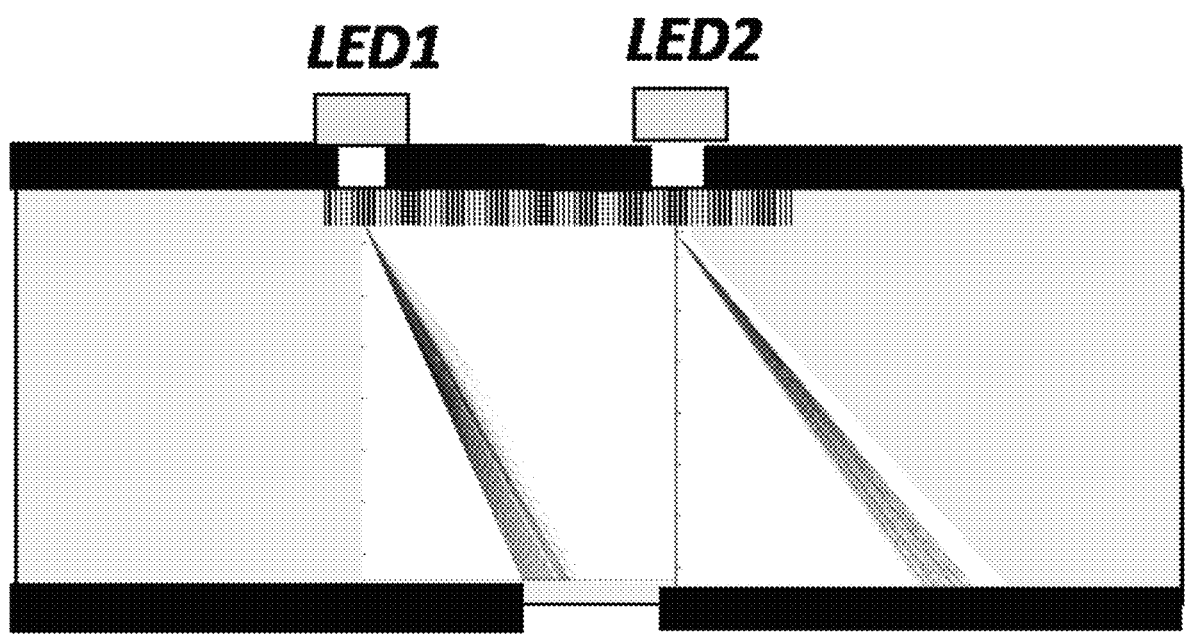
FIG. 9 is a schematic structural view of a color dispersion apparatus according to one embodiment of the present disclosure.

In one embodiment, more than one light source corresponds to one grating. For example, as shown in FIG. 9, two light sources correspond to one grating. For example, a blue light having a spectral width of 40 nm and a red light having a spectral width of 40 nm are collimated and irradiated onto the same grating. The grating diffracts the two lights at different diffraction angles. That is, the diffraction angle of the red light is larger than the diffraction angle of the blue light. As such, the purpose of the present application can be obtained.

In one embodiment, the collimated micro-LED light sources and the simple glass grating are formed on the upper surface of the glass substrate, the microfluidic channels are integrated on the bottom surface of the glass substrate, and the light sensors are integrated on another glass substrate. The wavelength of the light beams emergent from the upper glass substrate needs to be in one-to-one correspondence with the light sensors of the bottom glass substrate so as to conveniently and accurately monitor the signal transmitted through the material that is subjected to the detection.

During operation, the micro-LED is illuminated, and the light from the micro-LED is subjected to transmission and dispersion through the grating, so that beams of different wavelengths are emitted at different positions from the bottom surface of the top glass substrate. A microfluidic channel is formed on the bottom surface of the top glass substrate, where the microfluidic channel can be filled with gas or liquid that is to be subjected to detection, and the beam of specific wavelength causes a physical or chemical reaction with a tested material. The detector under the microfluidic channel receives the final optical signal and transmits the final optical signal to the data analysis system so as to complete the calibration or detection of the specific substance or gas.

This embodiment adopts a simple grating and utilizes bold glass as the optical substrate to efficiently realize a system for separating white light into a wide spectrum of colors and perform microfluidic detection. The system can also be used in other micro-gas or other micro-detection fields.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. A dispersion apparatus, comprising:
an optical substrate;
a grating layer on a first side of the optical substrate; and
a light outlet layer on a second side of the optical substrate, the second side opposite the first side of the optical substrate;
wherein the grating layer is configured to perform dispersion of incident light into first-order diffracted beams having target wavelengths and transmit the first-order diffracted beams into the optical substrate, and wherein a diffraction angle of each of the first-order diffracted beams having the target wavelengths is smaller than a total reflection angle between the optical substrate and air; and
wherein the light outlet layer is configured to extract the first-order diffracted beams having the target wavelengths in the optical substrate.

2. The dispersion apparatus according to claim 1, further comprising a collimated light source on a side of the grating layer opposite from the optical substrate, wherein the collimated light source emits the incident light onto the grating layer.

3. The dispersion apparatus according to claim 2, wherein the grating layer comprises a plurality of gratings, the collimated light source comprises a plurality of light sources, and one of the plurality of gratings corresponds to at least one of the plurality of light sources.

4. The dispersion apparatus according to claim 3, wherein the plurality of gratings are in one-to-one correspondence with the plurality of light sources.

5. The dispersion apparatus according to claim 4, wherein one of the plurality of gratings and one corresponding light source of the plurality of light sources have a same central axis.

6. The dispersion apparatus according to claim 3, wherein the light outlet layer comprises a plurality of light outlets, each of the plurality of gratings corresponds to at least one of the plurality of light outlets,
wherein the at least one of the plurality of light outlets is configured to extract one of the first-order diffracted beams in the optical substrate transmitted by the corresponding one of the plurality of gratings.

7. The dispersion apparatus according to claim 6, wherein a thickness t of the optical substrate and a width ΔD of one of the plurality of light outlets corresponding to one of the plurality of gratings satisfy:

$$\Delta D = (\tan \theta_{d\text{-}max} - \tan \theta_{d\text{-}min}) * t,$$

wherein $\theta_{d\text{-}max}$ is the maximum angle of the first-order diffraction angle of the first-order diffracted beam having target wavelengths extracted by the light outlet, $\theta_{d\text{-}min}$ is the minimum angle of the first-order diffraction angle of the first-order diffracted beams having the target wavelengths extracted by the light outlet.

8. The dispersion apparatus according to claim 7, further comprising:
first black matrices on both sides of each of the collimated light sources and configured to absorb light that is not incident at a target angle, wherein a width w1 of each respective first black matrix satisfies:

$$w1 = 2 * \tan \theta_{d\text{-}max} * t.$$

9. The dispersion apparatus according to claim 7, further comprising:
second black matrices on the second side of the optical substrate in one-to-one correspondence with the ratings, each respective second black matrix covering a portion of the second side of the optical substrate at least from a point which is an orthographic projection of a center of the corresponding grating on the second side of the optical substrate to a point of the light outlet nearest to the corresponding light source.

10. The dispersion apparatus according to claim 9, wherein centers of the second black matrices coincide with the points which are the orthographic projections of the centers of the corresponding gratings on the second black matrices respectively, and a width w2 of the second black matrix satisfy:

$$w2 = 2 * \tan \theta_{d\text{-}max} * t.$$

11. The dispersion apparatus according to claim 3, wherein each of the plurality of light sources comprises a light source and a collimating component, and wherein the collimating component has a micro- or nano-structure or is a light absorbing layer.

12. The dispersion apparatus according to claim 6, wherein two of the plurality of light outlets are disposed on opposite sides of each respective light source, so as to extract light in a same wavelength range, wherein the two light outlets alternately extract the first-order diffracted beams having adjacent target wavelengths.

13. The dispersion apparatus according to claim 3, wherein each of the plurality of light sources is a white micro-light emitting diode or a monochrome micro-light emitting diode.

14. The dispersion apparatus according to claim 1, wherein the light outlets on the second side of the optical substrate are provided with half-wavelength grating structures.

15. The dispersion apparatus according to claim 1, wherein a diffraction intensity of the first-order diffracted light beams is in a range from about 15% to about 30%.

16. A spectrometer comprising:
the dispersion apparatus according to claim 1;
a detection channel disposed on a side of the light outlet layer opposite from the optical substrate of the dispersion apparatus so as to receive one of the first-order diffracted beams having the target wavelengths; and
a detection substrate on which at least a light sensor is disposed to detect light emitted from the detection channel.

17. The spectrometer according to claim 16, wherein the detection channel comprises a microfluidic channel and wherein a modified hydrophilic film layer is coated on an inner wall of the microfluidic channel.

18. The spectrometer according to claim 16, wherein an upper portion of the detection channel comprises a fluid inlet port, a lower portion of the detection channel comprises a fluid outlet port, and wherein the detection channel is disposed in a black matrix on the second side of the optical substrate.

19. The spectrometer according to claim 16, wherein the light sensor is disposed so as to receive light from the light outlet that emits the diffracted beam having the target wavelength on the second side of the optical substrate.

20. The spectrometer according to claim 18, wherein a plurality of light sensors are disposed on the detection substrate, and wherein the light sensors are disposed in one-to-one correspondence with the first-order diffracting beams having the target wavelengths emitted from the light outlets respectively.

\* \* \* \* \*